Oct. 8, 1940.   A. B. HENDRICKS, JR   2,217,442
ELECTRICAL INDUCTION APPARATUS
Filed Nov. 18, 1937   3 Sheets-Sheet 3
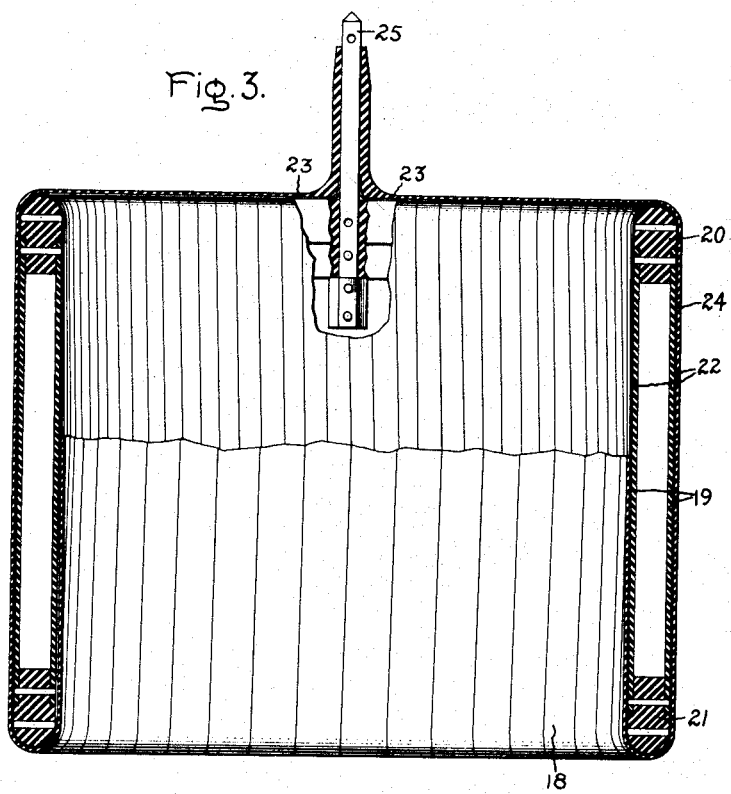
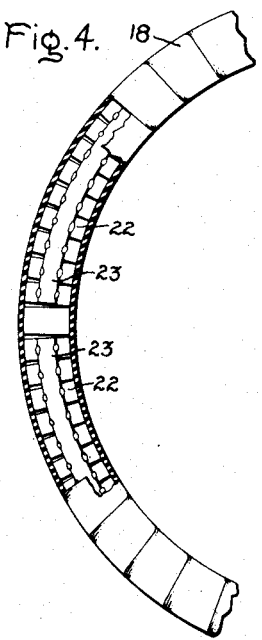
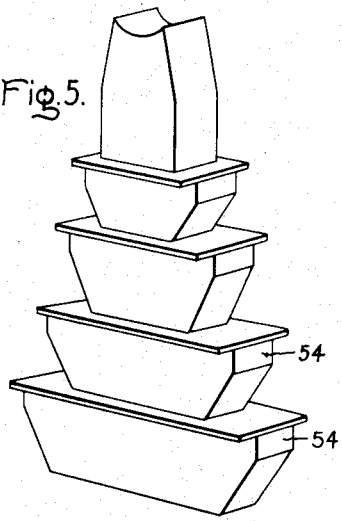
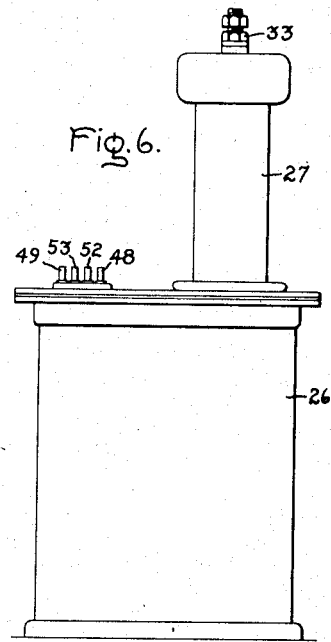
Inventor:
Allan B. Hendricks, Jr.
by Harry E. Dunham
His Attorney.

Patented Oct. 8, 1940

2,217,442

UNITED STATES PATENT OFFICE 2,217,442

ELECTRICAL INDUCTION APPARATUS

Allan B. Hendricks, Jr., Pittsfield, Mass., assignor to General Electric Company, a corporation of New York Application November 18, 1937, Serial No. 175,186

8 Claims. (Cl. 175—356)

My invention relates to electrical induction apparatus such as transformers and reactors and particularly to apparatus of this type for operation at high voltage.

The general object of the invention is to provide electrical induction apparatus of extremely compact construction with consequent small size and weight and economical cost for materials. Another object of the invention is to provide apparatus for efficient operation at high voltage and at the same time with low reactance. A further object of the invention is to provide a magnetic core and winding arrangement in which all the parts may be effectively cooled by a suitable insulating liquid in which the transformer is immersed. A still further object of the invention is to provide an improved construction of electrical induction apparatus which will be highly resistant to any damaging effects of high transient voltages applied across its terminals.

Figure 1:
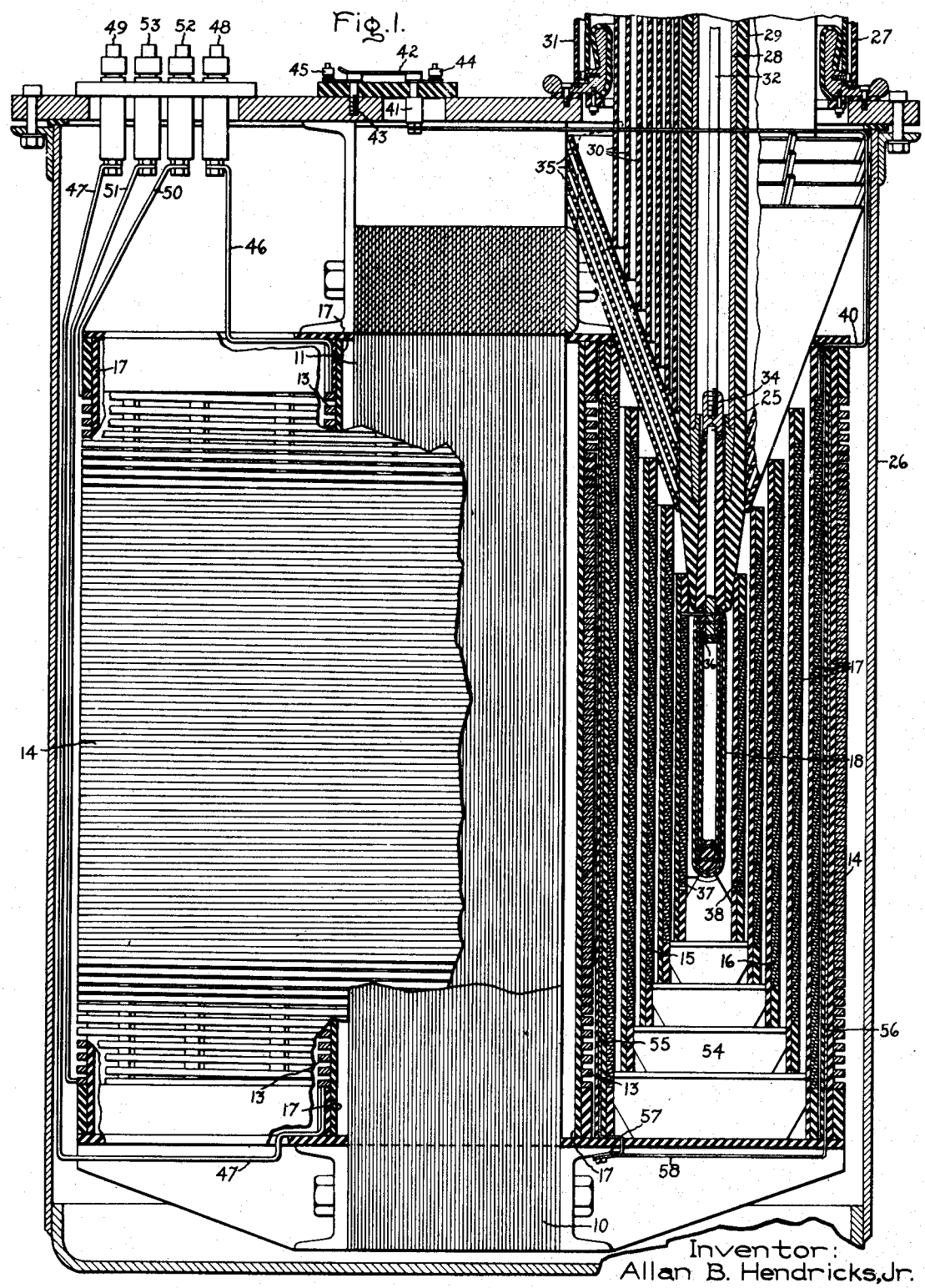
Figure 2:
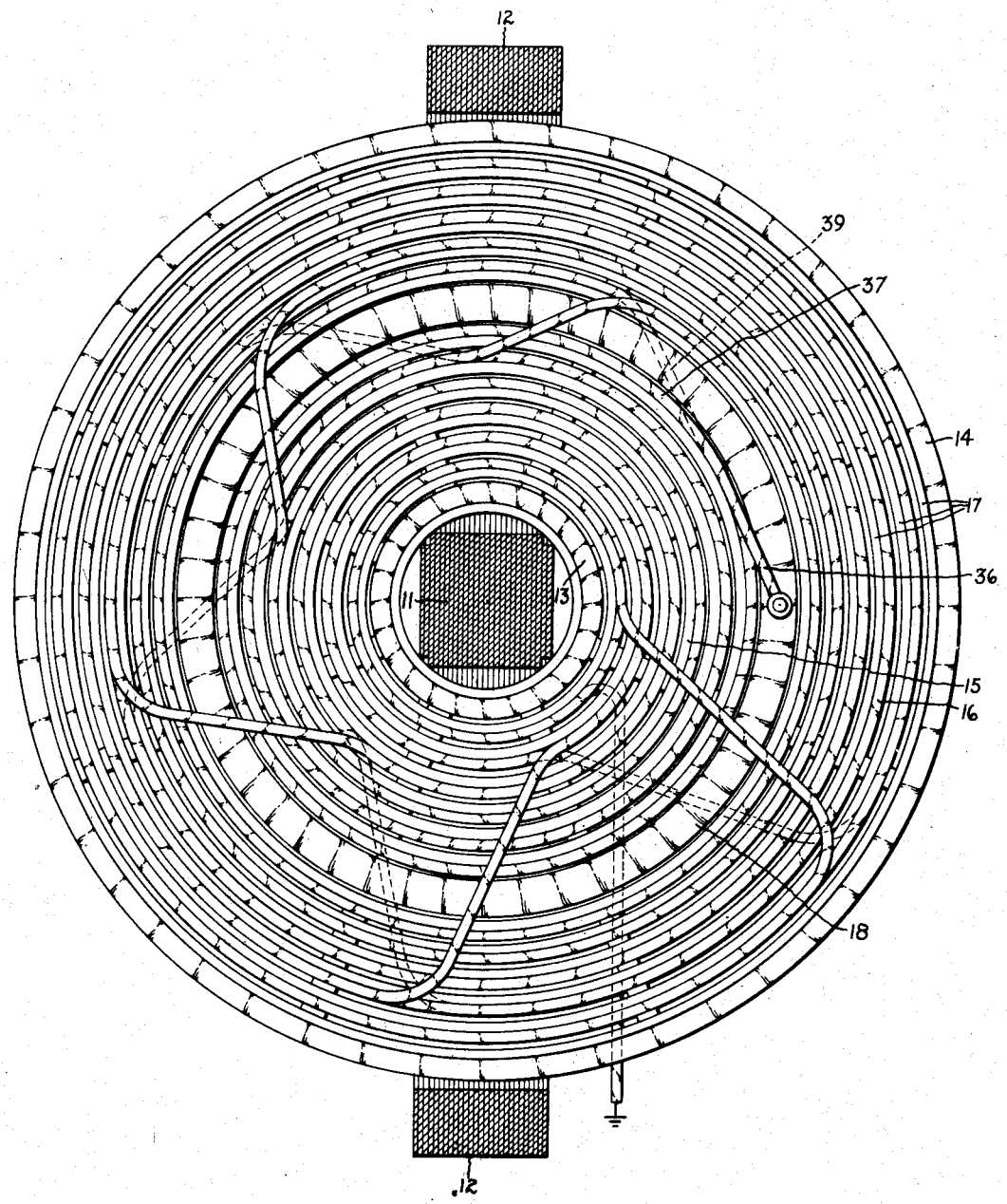

The invention will be better understood from the following description taken in connection with the accompanying drawings in which Fig. 1 is a sectional view of a transformer constructed in accordance with the invention; Fig. 2 is a top or end view of windings and winding connections similar to those of the transformer shown in Fig. 1; Figs. 3, 4 and 5 are detailed views of some of the parts of the transformer; and Fig. 6 is an external view in elevation of the transformer casing with its bushings and terminals.

Like reference characters indicate similar parts in the different figures of the drawings.

The transformer shown in Fig. 1 includes a magnetic core 10 having a vertical center winding leg 11 and two outer legs 12. The winding leg 11 is surrounded by two concentrically spaced cylindrical low voltage windings 13 and 14 and by a high voltage winding including two groups of cylindrical sections 15 and 16 arranged in the space between the two low voltage windings 13 and 14. The turns of each of the low voltage windings 13 and 14 and of each cylindrical section of the high voltage groups 15 and 16 are supported by insulating cylinders 17. An electrostatic cylinder 18 is supported between the two groups 15 and 16 of the high voltage winding sections.

The electrostatic cylinder 18, as shown most clearly in Fig. 3, includes two concentric spaced insulating cylinders 19 secured between insulating end rings 20 and 21. The outer edges of these rings 20 and 21 are smoothly curved and these rings and the cylinders 19 form a single insulating cylindrical body with smoothly rounded ends. This cylindrical insulating support is wound with a conductive band or ribbon 22, the turns of this ribbon being connected along the upper edge of the supporting cylinder by a conductive band 23 to which they are soldered. The insulating support is thus covered by a conductive layer formed by the conductive turns 22 and this conductive layer is insulated by an insulating covering 24. The conductive layer formed by the turns 22 is connected by the conductive band 23 to an insulated conductive stem 25 projecting from one side of the upper edge of the electrostatic cylinder 18.

The transformer is enclosed in a casing 26 having an opening in its cover for a high voltage bushing 27. This high voltage bushing 27 includes a central conductive tube 28 covered by an insulating layer 29 and surrounded by spaced insulating cylinders 30 within an outside cylindrical insulating casing 31. A conductive rod 32 within the conductive tube 28 connects the stem 25 of the electrostatic cylinder 18 to the high voltage terminal 33 of the transformer. In assembling the transformer and its bushing, the bushing is lowered into place through the opening in the casing 26 with the lower end of the conductive tube 28 and its insulating layer 29 surrounding the upper end of the insulated conductive stem 25 of the electrostatic cylinder 18. The lower edges of the insulating cylinders 30 are close to a number of spaced insulating cones 35 which provide increased insulation between the upper end turns of the high voltage winding sections and the conductive connection through the bushing 27 from the electrostatic cylinder 18 to the high voltage terminal 33 of the transformer. The high voltage terminal of the transformer 33 is connected through the rod 32, the stem 25 and a connection 36 to the upper end of that section 37 of one of the high voltage winding groups which is adjacent to the other group. The lower end of this high voltage winding section 37 is connected to the adjacent high voltage winding section 38 of the other high voltage group by a connection 39. The remaining high voltage winding sections are alternately connected in series in a similar manner, as shown most clearly in Fig. 2, the end of the last section being connected by a conductor 40, an insulated stud 41 and a spring 42 to a grounded stud 43. The high voltage winding is thus connected between the grounded stud 43 and the high voltage terminal 33 of the transformer. With the spring 42 pressing against the grounded stud 43, one end of the high voltage winding is connected directly to ground. The studs 41 and 43 are provided respectively with terminals 44 and 45.

If a measurement of current in the high voltage winding is desired, an ammeter may be connected in its circuit by connecting the ammeter between the terminals 44 and 45 and disconnecting the spring 42 from the stud 43 by means of a thin sheet of insulation such as a piece of paper. The low voltage winding 13 is connected by conductors 46 and 47 between two terminals 48 and 49. The low voltage winding 14 is similarly connected by conductors 50 and 51 between two terminals 52 and 53. The two low voltage windings 13 and 14 may be conveniently connected either in series or in parallel as desired by making the proper connections at the low voltage terminals 48, 49, 52 and 53.

Because of the relatively opposite radial order in which the successive sections of each of the high voltage winding groups 15 and 16 are connected between ground and the high voltage terminal, the voltages of the sections in each group are of progressively increasing magnitude above ground from the adjacent low voltage winding 13 or 14 toward the electrostatic cylinder 18. The voltage above ground of the high voltage winding section nearest the electrostatic cylinder 18 is thus of greatest magnitude in each of the winding groups 15 and 16 and the voltages above ground of the other high voltage winding sections in each group are of progressively decreasing magnitude toward the adjacent low voltage winding. The high voltage cylindrical winding sections or layers of conductive turns of each high voltage winding group 15 and 16 are of progressively increasing length from the electrostatic cylinder 18 toward the respective inner and outer low voltage winding 13 and 14. The lengths of the winding sections or layers of conductive turns of each group thus progressively decrease toward the other group. The ends of the high voltage winding sections or layers of conductive turns are thus spaced farther and farther from the top and bottom of the enclosing tank 26 and from the top and bottom yokes of the core 10 as the voltages above ground of these winding sections increase so that each of the winding sections or layers of conductive turns is spaced and insulated from ground in proportion to its voltage above ground. This arrangement of the high voltage winding sections provides a space in the upper end of the winding which is V-shaped in cross section and into which the lower ends of the high voltage bushing and the insulating cones 35 and cylinders 30 project, as shown in Fig. 1. The arrangement also provides a similar space in the lower end of the winding for stacks of radially arranged insulating blocks or supports 54 shown assembled in the transformer in Fig. 1 and shown in perspective detail in Fig. 5. These insulating blocks 54 serve to space the insulating cylinders 17 which support the high voltage winding sections or layers of turns and they are of progressively decreasing length toward the electrostatic cylinder 18 which is itself supported by the upper blocks 54. Each of these insulating blocks 54 below the upper one projects at its ends beyond the block above it to support one of the high voltage winding sections in each of the winding groups 15 and 16.

When a high transient voltage appears at the terminal 33 of the transformer, the distribution of this voltage along the turns of the high voltage winding is determined by the capacitance network of the winding in accordance with the principles fully explained in the James M. Weed Patent No. 1,585,448, issued May 18, 1926, and assigned to the General Electric Company. The inner group 15 of the high voltage winding sections is arranged between the electrostatic cylinder 18 and a conductive cylinder 55 disposed between the low voltage winding 13 and the adjacent high voltage winding section. The outer group 16 of the high voltage sections is arranged between the electrostatic cylinder 18 and a conductive cylinder 56 disposed between the low voltage winding 14 and the adjacent high voltage winding section. The two conductive cylinders 55 and 56 are connected to ground by the conductors 57 and 58. The conductive electrostatic cylinder 18 is directly connected to the high voltage terminal 33 of the transformer so that its potential is always the same as that of the terminal. When a high voltage transient appears at the terminal 33, the voltage of the electrostatic cylinder 18 is instantly increased to the same value and the groups 15 and 16 of the high voltage winding sections are disposed in electrostatic fields induced by the voltage between the electrostatic cylinder 18 and the two grounded conductive cylinders 55 and 56. In order that the initial distribution of a high transient voltage may be substantially uniform throughout the high voltage winding so that any section of the winding will be subjected only to its proportionate share of the voltage, the high voltage winding sections or layers of turns in each of the groups 15 and 16 should be so spaced from each other and from the electrostatic cylinder 18 and the grounded cylinders 55 and 56 that the capacitances between the layers of turns of each group will be approximately of equal value. It is not necessary, however, that the capacitances between the layers of turns of one group be the same as that between the layers of turns of the other group. Because of the greater lengths and smaller diameters of the layers of turns of the inner group 15 nearer the grounded cylinder 55, the capacitances between these inner layers of turns would be approximately the same as those between the shorter layers of turns nearer the electrostatic cylinder 18 if the spacing were the same between all the layers of turns of this group. The lengths and diameters of the layers of turns of the outer group, however, are greatest near the outer grounded cylinder 56, and the capacitances between these layers of turns of the outer group would increase from the inner to the outer layers of turns if the spacings between the layers of turns were alike. The capacitances between the layers of turns are determined by various factors such as the lengths, diameters, and spacings of the layers of turns and the specific capacitance of the insulation between the layers. In order to equalize these capacitances, the spacings of the longer layers are greater than the spacings of the shorter layers to the extent necessary to assure a substantially uniform initial distribution of high transient voltage.

Because of the differences in the lengths of the cylindrical layers of turns of the high voltage winding, the distribution of the turns of this winding is not uniform along the winding leg 11 of the core 10. It is desirable that the relative distribution of the turns of the low voltage windings 13 and 14 be the same as that of the high voltage winding and the turns near the ends of the low voltage winding are therefore more widely spaced than are the intermediate turns of this winding so that the relative distribution of the turns of both windings will be substantially the same.

In the transformer construction which has been described, all of the winding sections are of cylindrical form and are concentrically spaced from each other about a vertical axis. The transformer is arranged to be immersed in an insulating liquid in the casing 26 and the vertical arrangement of the spaced winding sections provides vertical ducts so that the insulating liquid may readily circulate by convection and provide effective cooling of the transformer. The transformer requires an exceedingly small amount of insulation because the high voltage end of the winding is disposed well inside the structure of the winding and both the inner and outer layers of the winding are at or near ground potential. It is obvious that even for a very high voltage winding only a very small amount of insulation is necessary between it and adjacent parts of the transformer. This contributes to extreme compactness and a highly efficient utilization of the winding spaces through the magnetic core with consequent high efficiency, low reactance, small size and weight and low cost. Another inherent advantage of the high voltage winding arrangement is that the stray magnetic and electrostatic fields are confined almost entirely to the space between the inner and outer sections of the winding and consequently the stray losses caused by these fields are negligible in any adjacent conducting or insulating materials such as the magnetic core 10 with its supports and the casing 26 enclosing the transformer. This permits the use of a casing 26 which closely encloses the core and windings without danger of objectionable losses.

The invention has been explained by describing and illustrating the details of a particular transformer constructed in accordance with the invention, but it will be apparent that changes may be made without departing from the spirit of the invention and the scope of the appended claims.

What I claim as new and desire to secure by Letters Patent of the United States is:

1. Electrical induction apparatus including a magnetic core having a winding leg, and a high voltage winding surrounding said winding leg and including an inner group of cylindrical layers of conductive turns and an outer group of cylindrical layers of conductive turns surrounding the inner group, the layers of turns of both groups being connected in series with the layers of turns disposed alternately in the two groups, the lengths of the layers of conductive turns of each group progressively decreasing toward the other group, and the lengths and spacings of the layers of conductive turns and the specific capacitances of the insulation between the layers being proportioned to produce a capacitance network for initially distributing a high transient voltage substantially uniformly throughout the winding.

2. Electrical induction apparatus including a magnetic core having a winding leg, and a high voltage winding surrounding said winding leg and including an inner group of cylindrical layers of conductive turns and an outer group of cylindrical layers of conductive turns surrounding the inner group, said layers of turns being connected in series, and each layer of each group except the two end layers of the series being connected between two layers of the other group, the lengths of the layers of turns of each group progressively decreasing toward the other group, and the lengths and spacings of the layers of turns and the specific capacitances of the insulation between the layers being proportioned to produce a capacitance network for initially distributing a high transient voltage substantially uniformly throughout the winding.

3. Electrical induction apparatus including a magnetic core having a winding leg, an inner group of cylindrical high voltage layers of conductive turns, an outer group of cylindrical high voltage layers of conductive turns surrounding the inner group, and a high voltage terminal connected to that layer of one of said groups which is adjacent to the other group, the lengths of the layers of conductive turns of each group progressively decreasing toward the other group, and the lengths and spacings of the layers of turns and the specific capacitances of the insulation between the layers being proportioned to produce a capacitance network for initially distributing a high transient voltage substantially uniformly throughout the winding.

4. Electrical induction apparatus including a magnetic core having a winding leg, a high voltage winding surrounding said winding leg and including an inner group of cylindrical layers of conductive turns and an outer group of cylindrical layers of conductive turns surrounding the inner group, the lengths of the winding layers of conductive turns of each group progressively decreasing toward the other group to form a space extending into an end of the winding, and a high voltage terminal connection extending into said space and connected to that layer of conductive turns of one group which is adjacent to the other group, the lengths and spacings of the layers of conductive turns and the specific capacitances of the insulation between the layers being proportioned to produce a capacitance network for initially distributing a high transient voltage substantially uniformly throughout the winding.

5. Electrical induction apparatus including a magnetic core having a winding leg, two spaced conductive cylinders connected to ground and surrounding said winding leg, a high voltage winding between said cylinders and including an inner group of spaced cylindrical sections of different lengths and an outer group of spaced cylindrical sections of different lengths surrounding the inner group, and a conductive cylinder between the two groups of winding sections and connected to the terminal of an adjacent section, said winding sections being connected in series with successive sections disposed alternately in the two groups, the successive winding sections of each group being disposed in opposite radial order from that of the sections of the other group, the lengths and spacings of the winding sections of each group and the specific capacitance of the insulation between the sections being proportioned to produce a capacitance network for initially distributing a high transient voltage substantially uniformly throughout the winding.

6. Electrical induction apparatus including a magnetic core having a winding leg, and a high voltage winding surrounding said winding leg and including two groups of layers of conductive turns, the lengths and areas of the layers of the outer group progressively diminishing toward the inner group, and the capacitances between adjacent layers of turns of each group being substantially equal.

7. Electrical induction apparatus including a magnetic core having a winding leg, and a high voltage winding surrounding said winding leg and including two groups of layers of conductive turns, the lengths and areas of the layers of turns of each group progressively diminishing toward the other group, and the capacitances between adjacent layers of each group being substantially equal.

8. Electrical induction apparatus including a magnetic core having a winding leg, and a high voltage winding surrounding said winding leg and including an inner group of cylindrical layers of conductive turns and an outer group of cylindrical layers of conductive turns surrounding the inner group, the insulation between adjacent layers of each group comprising at least two dielectric members having different specific capacitances, the areas of the conductive layers of the outer group progressively diminishing toward the inner group, and the relative thicknesses and specific capacitances of said dielectric members being proportioned to compensate for the effect of said diminishing areas of the layers on the capacitances between adjacent layers to provide equal capacitances between layers.

ALLAN B. HENDRICKS, Jr.